US012632708B2

(12) United States Patent
Sudarsanan et al.

(10) Patent No.: US 12,632,708 B2
(45) Date of Patent: May 19, 2026

(54) QUANTIZED NEURAL NETWORK ARCHITECTURE

(71) Applicant: QUALCOMM Incorporated, San Diego, CA (US)

(72) Inventors: Srijesh Sudarsanan, Waltham, MA (US); Deepak Mathew, Acton, MA (US); Marc Hoffman, Mansfield, MA (US); Sundar Rajan Balasubramanian, Groton, MA (US); Gerald Sweeney, Chelmsford, MA (US); Mansi Jain, Littleton, MA (US); James Lee, Northborough, MA (US); Ankita Nayak, Milpitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 702 days.

(21) Appl. No.: 17/934,476

(22) Filed: Sep. 22, 2022

(65) Prior Publication Data

US 2024/0104356 A1     Mar. 28, 2024

(51) Int. Cl.
*G06N 3/048* (2023.01)
*G06N 3/0495* (2023.01)
*G06N 3/063* (2023.01)

(52) U.S. Cl.
CPC .................................... *G06N 3/048* (2023.01)

(58) Field of Classification Search
CPC ....... G06N 3/048; G06N 3/063; G06N 3/0495
See application file for complete search history.

(56) References Cited

U.S. PATENT DOCUMENTS

| | | | | |
|---|---|---|---|---|
| 11,494,657 B2 * | 11/2022 | Sather | .................... | G06N 3/063 |
| 2019/0042935 A1 * | 2/2019 | Deisher | .................... | G06F 5/01 |
| 2019/0294413 A1 * | 9/2019 | Vantrease | ............. | G06F 7/5095 |
| 2019/0339939 A1 | 11/2019 | Ito et al. | | |

(Continued)

FOREIGN PATENT DOCUMENTS

| | | | | | |
|---|---|---|---|---|---|
| WO | WO-2023280113 A1 * | 1/2023 | ............... | G06N 3/04 |
| WO | WO-2023004800 A1 * | 2/2023 | ............... | G06N 3/04 |

OTHER PUBLICATIONS

Oh, Jihun, et al. "Weight equalizing shift scaler-coupled post-training quantization." arXiv preprint arXiv:2008.05767 (2020). (Year: 2020).*

(Continued)

*Primary Examiner* — Dennis Truong
(74) *Attorney, Agent, or Firm* — Patterson & Sheridan LLP

(57) ABSTRACT

Certain aspects of the present disclosure provide techniques and apparatus for quantized machine learning. A quantized input matrix is accessed at a layer of a neural network, and a first interim value is generated in an accumulator by performing matrix multiplication, using the accumulator, of the quantized input matrix and a quantized weight matrix associated with the layer of the neural network. The first interim value is normalized based at least in part on one or more leading sign bits of the first interim value, and the normalized first interim value is dequantized. A second interim value is generated by applying a rounded right-shift operation to the dequantized normalized first interim value, and activation data is generated by applying an activation function to the second interim value.

30 Claims, 7 Drawing Sheets

(56) References Cited

U.S. PATENT DOCUMENTS

| | | | | |
|---|---|---|---|---|
| 2020/0210839 A1* | 7/2020 | Lo | ......................... | G06F 9/5027 |
| 2020/0264876 A1* | 8/2020 | Lo | ......................... | G06N 3/063 |
| 2021/0287095 A1* | 9/2021 | Lin | ..................... | G06N 3/0495 |
| 2021/0303977 A1* | 9/2021 | Sun | ..................... | G06F 9/3001 |

OTHER PUBLICATIONS

Fang, Jun, et al. "Post-training piecewise linear quantization for deep neural networks." Computer Visional ECCV 2020: 16th European Conference, Glasgow, UK, August 23â28, 2020, Proceedings, Part II 16. Springer International Publishing, 2020 (Year: 2020).*
International Search Report and Written Opinion—PCT/US2023/070759—ISA/EPO—Oct. 5, 2023.
Oh J., et al., "Weight Equalizing Shift Scaler-Coupled Post-training Quantization," Arxiv.Org, Cornell University Library, 201 Olin Library Cornell University Ithaca, NY 14853, Aug. 13, 2020, 9 Pages, XP081739943, p. 1-5, Figure 2, The whole document.

* cited by examiner

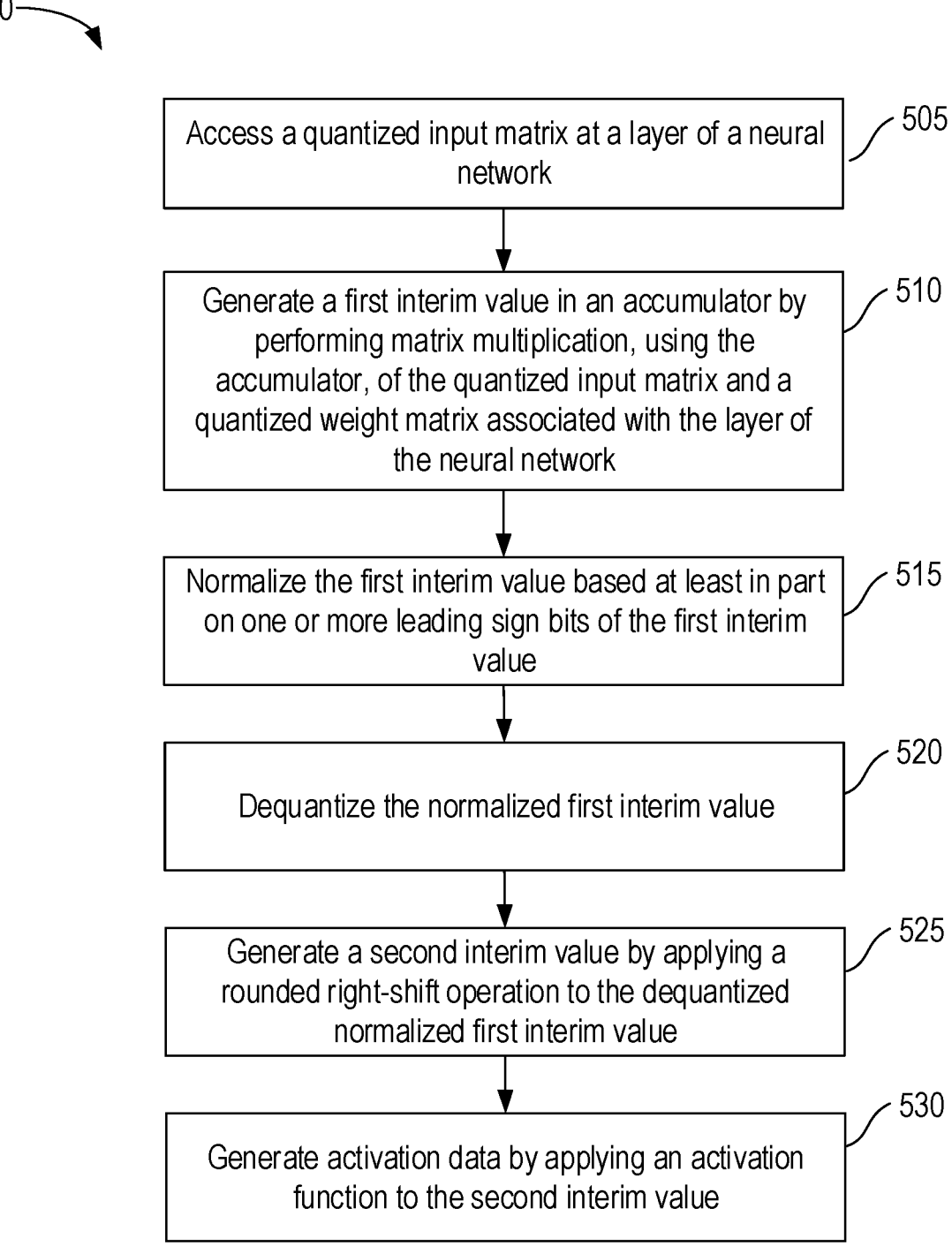

500

505 — Access a quantized input matrix at a layer of a neural network

510 — Generate a first interim value in an accumulator by performing matrix multiplication, using the accumulator, of the quantized input matrix and a quantized weight matrix associated with the layer of the neural network 515 — Normalize the first interim value based at least in part on one or more leading sign bits of the first interim value 520 — Dequantize the normalized first interim value 525 — Generate a second interim value by applying a rounded right-shift operation to the dequantized normalized first interim value 530 — Generate activation data by applying an activation function to the second interim value

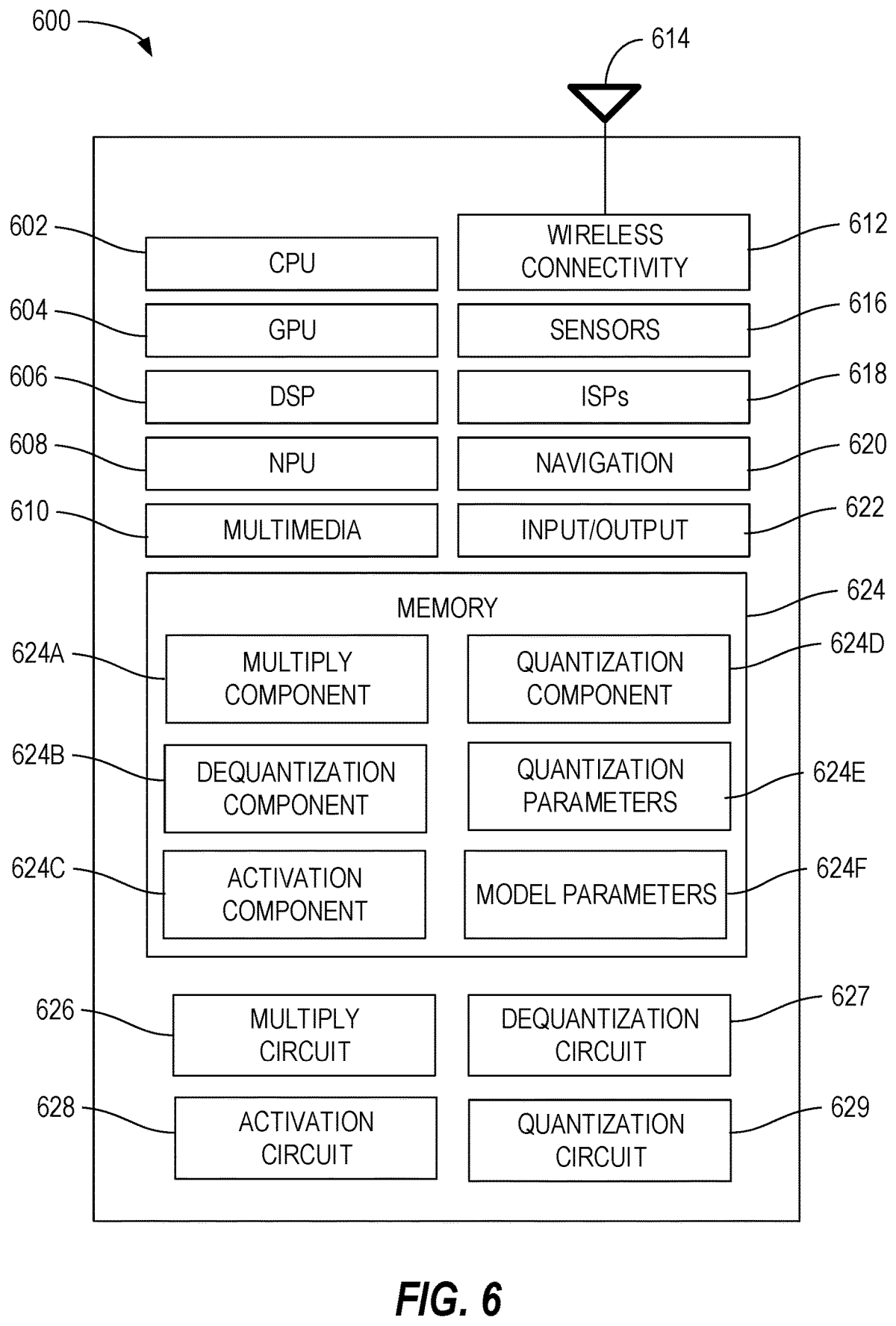

602 — CPU

604 — GPU

606 — DSP

608 — NPU

610 — MULTIMEDIA

612 — WIRELESS CONNECTIVITY

616 — SENSORS

618 — ISPs

620 — NAVIGATION

622 — INPUT/OUTPUT

624 — MEMORY

624A — MULTIPLY COMPONENT

624B — DEQUANTIZATION COMPONENT

624C — ACTIVATION COMPONENT

624D — QUANTIZATION COMPONENT

624E — QUANTIZATION PARAMETERS

624F — MODEL PARAMETERS

626 — MULTIPLY CIRCUIT

627 — DEQUANTIZATION CIRCUIT

628 — ACTIVATION CIRCUIT

629 — QUANTIZATION CIRCUIT

*FIG. 6*

QUANTIZED NEURAL NETWORK ARCHITECTURE

INTRODUCTION

Aspects of the present disclosure relate to quantized machine learning.

Machine learning, such as using neural network models, is a versatile and dynamic tool to help solve a wide variety of tasks, including computer vision, voice recognition, signal analysis, and the like. However, such models generally require significant computational resources both during training as well as during inferencing. For example, the parameters of the model (e.g., weights and/or biases), as well as the input and activation data (as input samples are processed through the model) are often stored and processed in floating-point formats, which require not only substantial memory space, but also introduce significant data transmission and processing overhead.

Some conventional approaches to reduce the computational burden of such models involve quantizing of some or all of the data. Quantization generally refers to the process of converting or constraining input from a relatively larger value space (e.g., a continuous set of values) to a relatively smaller value space (e.g., a discrete set of values), thereby reducing memory, transmission, and processing overhead. For example, affine integer quantization uses a mixture of integer and floating-point computations to improve the latency and memory requirements of training and inferencing with machine learning models.

Accordingly, techniques are needed for improved quantized machine learning.

BRIEF SUMMARY

One aspect provides a method, comprising: accessing a quantized input matrix at a layer of a neural network; generating a first interim value in an accumulator by performing matrix multiplication, using the accumulator, of the quantized input matrix and a quantized weight matrix associated with the layer of the neural network; normalizing the first interim value based at least in part on one or more leading sign bits of the first interim value; dequantizing the normalized first interim value; generating a second interim value by applying a rounded right-shift operation to the dequantized normalized first interim value; and generating activation data by applying an activation function to the second interim value.

Other aspects provide processing systems configured to perform the aforementioned method as well as those described herein; non-transitory, computer-readable media comprising instructions that, when executed by a processor of a processing system, cause the processing system to perform the aforementioned method as well as those described herein; a computer program product embodied on a computer-readable storage medium comprising code for performing the aforementioned method as well as those further described herein; and a processing system comprising means for performing the aforementioned method as well as those further described herein.

The following description and the related drawings set forth in detail certain illustrative features of one or more aspects.

BRIEF DESCRIPTION OF THE DRAWINGS

The appended figures depict certain aspects of the one or more aspects and are therefore not to be considered limiting of the scope of this disclosure.

FIG. 5 depicts an example flow diagram illustrating a method for quantized machine learning.

FIG. 6 depicts an example processing system configured to perform various aspects of the present disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
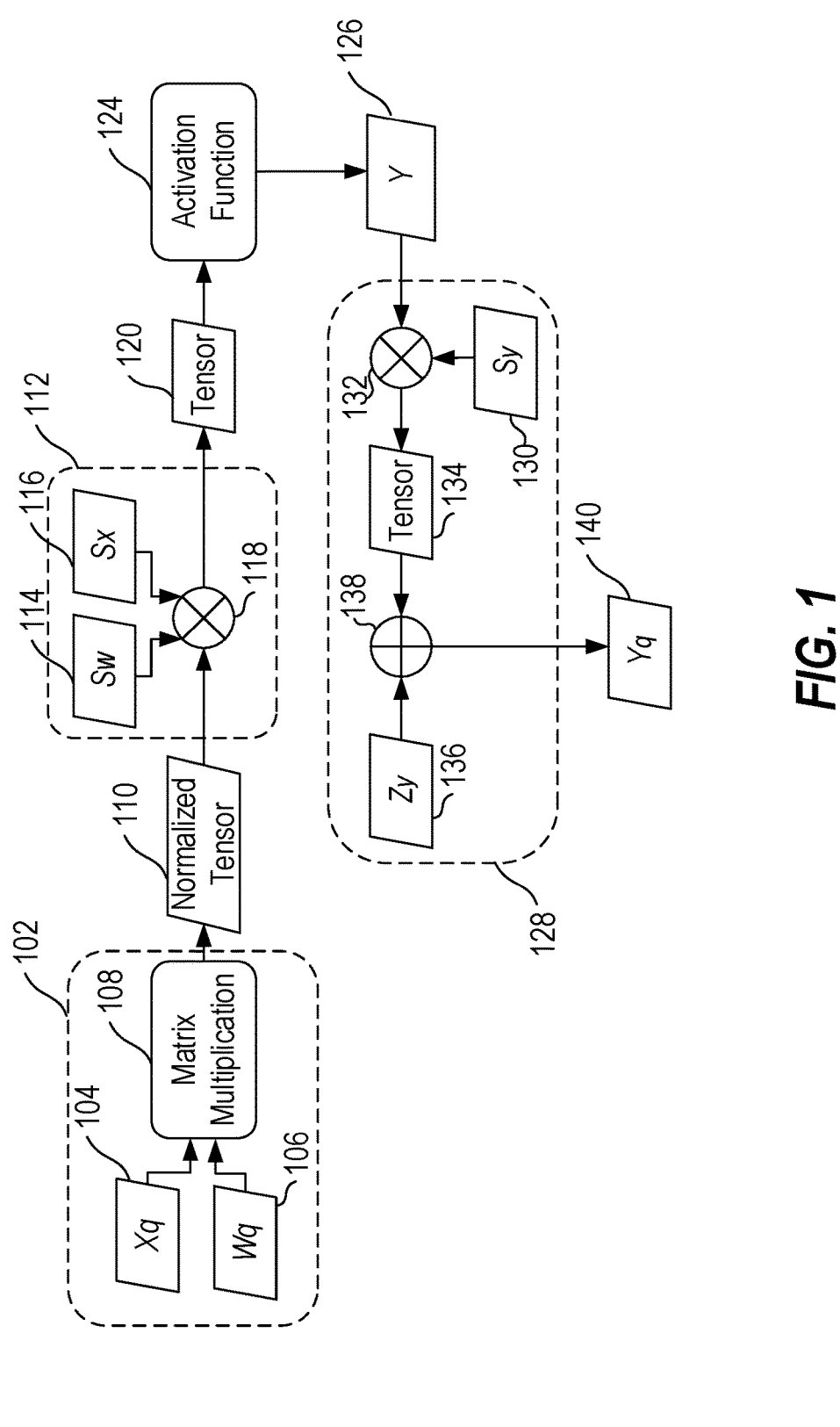
FIG. 1 depicts an example architecture for improved quantized machine learning.

Aspects of the present disclosure provide improved quantized neural network architectures.

Neural network quantization using affine integer quantization is a useful paradigm for computing inference workloads on edge devices (e.g., on devices with relatively limited computational resources, such as smartphones). In some such approaches, fixed-point integer representations can be used to represent floating-point quantities in the data path to avoid or reduce the need dedicated floating point hardware units. However, choosing appropriate fixed-point formats to represent various variables in the data-path is challenging, and the challenge of maintaining fractional precision is significantly exacerbated when small bit-widths (e.g., less than 32 bits) are desired for outputs and intermediate variables.

In some aspects of the present disclosure, new and/or modified data-paths are provided to enable the retention of maximal fractional precision while minimizing the bit-width needed to store variables in memory. The present disclosure provides a reproducible framework for designing optimized training and inference workloads, and uses operations and/or hardware that are already available on a wide variety of processor architectures. Thus, aspects described herein may beneficially be implemented in a wide range of machine learning architectures.

Aspects of the present disclosure are readily applicable to the computation of any neural network training or inference workloads. In some aspects, the architectures and techniques disclosed herein may be particularly useful on resource-constrained platforms (e.g., those with limited memory, bandwidth, compute power, and the like) as the disclosed architectures and techniques enable accurate training and inferencing with substantially reduced computational overhead through improved quantized data paths. For example, aspects of the present disclosure enable use of quantized neural networks on a variety of devices, such as wearables having on-chip inference capability, smart devices (including smart home appliances), Internet of Things (IoT) devices, edge processing devices, always-on devices, and the like.

In aspects of the present disclosure, selective normalization and rounded right-shift operations are used to modify the network data path in a way that enables improved fractional precision (resulting in prediction accuracy that is the same or better than conventional quantized systems) and reduced computational expense (e.g., allowing for the operations to be performed using smaller bit-widths).

As used herein, fixed-point values are denoted or defined as N[S/U]F, where N is the bit-width of the value, S/U refers to whether the value is signed, and F refers to the number of fractional bits. For example, a 16S12 fixed point number is a 16-bit signed number having 12 fractional bits (e.g., having a range of $[-2^3, 2^3-2^{-12}]$).

In aspects of the present disclosure, a "right-shift" operation refers to rounded right shift. The rounded right shift generally involves determining and adding a rounding bias when shifting the value, improving propagation of the fractional value. For example, in at least one aspect, to right shift a value a by n bits, the system may compute a rounding bias as $1<<(n-1)$ (e.g., a value of one, left-shifted by n−1), then compute the output of the rounded right shift as (a+rounding_bias)>>n) (e.g., the sum of the rounding bias and a, right-shifted by n). If n is less than or equal to zero, then the system may instead generate the output as sat(a<<(−n)) (e.g., a left-shifted by (−n), and saturated to the full bit width available).

In aspects of the present disclosure, a "normalization" operation returns the number of leading sign bits of the input value, as well as a normalized value that is left-shifted by the number of leading sign bits. For example, the normalized value of an input a may be computed by counting the number of leading sign bits of a (e.g., the number of most-significant bits that are the same as the sign bit), and left shifting a by the determined number of leading sign bits. This normalization can improve the accuracy of the model by preserving lower-order bits that are otherwise lost during subsequent truncation (e.g., using saturation and/or right-shift operations). That is, the truncation or right shifting is likely to drop only bits that were added by the normalization operation, rather than bits carrying actual data, as discussed below in more detail. This allows the normalized and/or right-shifted values to be stored in significantly smaller bit-widths, as compared to conventional systems.

By using normalizing and rounded right-shift operations in the data path, aspects of the present disclosure are able to provide accurate and reliable predictions with significantly reduced bit-widths for model parameters, as well as intermediate values in the model. For example, rather than relying on 32 bit-width numbers for intermediate values, some aspects of the present disclosure can use 16-bits without loss in model precision (or while minimizing loss in model precision).

Example Architecture for Improved Quantized Machine Learning

FIG. 1 depicts an example architecture 100 for improved quantized machine learning. In the illustrated example, the architecture 100 corresponds to a datapath and set of operations to implement a fully connected layer of a neural network.

In some aspects, to quantize a given value, the value is divided by a learned scaling factor, and a learned zero point value is added to the result. Generally, the scaling factor can be learned based on the range of values seen in the unquantized data during training, while the zero point can be established based on finding a linear relationship between the minimum quantized and minimum un-quantized values seen during training. For example, input tensor X may be quantized as $$X_q = \frac{X}{S_X} + Z_X,$$

where $X_q$ is the quantized input (e.g., the quantized version of the input tensor X), $S_X$ is the scaling factor learned for the input tensor X, and $Z_X$ is the learned zero point for the input tensor X.

In some aspects discussed herein, the "zero point" can generally be used to offset the range of the input data, and corresponds to the quantized value of an input value of 0. For example, if the zero point is 0, then an input value of 0 remains 0 after quantizing, while if the zero point is 5, then an input value of 0 becomes a value of 5 after quantizing. The scaling factor is generally used to define the range of the quantized data (e.g., to reduce or increase the range of the inputs).

In some aspects, to dequantize a value, the learned zero point is subtracted from the value, and the resulting difference is multiplied by a learned scaling factor. For example, quantized input $X_q$ may be dequantized as $X=S_X(X_q-Z_X)$.

In the illustrated example, the output of a fully connected layer of a neural network can be defined as $Y=f_{act}(WX+b)$, where Y is the output tensor, X is the input tensor, W is the weights of the layer, b is the bias(es) of the layer, and $f_{act}$ corresponds to application of an activation function, such as ReLU and others. In the illustrated example using quantized values, the quantized input, weights, and biases may be given as $X_q$, $W_q$, and $b_q$, respectively. In an aspect, therefore, the output of a quantized fully connected layer may be defined using equation (1) below, where dequant( ) is a dequantizing operation.

$$Y=f_{act}(\text{dequant}(W)-\text{dequant}(X_q)+\text{dequant}(b_q)) \tag{1}$$

As discussed above, the dequantization operation may be performed using the scale factors and zero points learned for each value. Therefore, the output of the fully connected quantized layer may be defined using equation (2) below.

$$Y=f_{act}(S_W(W-Z_W)S_X(X_q-Z_X)+S_b(S_q-Z_b)) \tag{2}$$

In some aspects, equation (2) may be rearranged to provide a set of operations or blocks, illustrated in FIG. 1, that enable optimized processing of data. Specifically, in the illustrated example, the output Y can be defined using equation (3) below.

$$y = f_{act}\left(S_W S_X\left(W_q X_q - Z_W X_q - W_q Z_X + Z_W Z_X + \frac{S_b}{S_W S_X}(b_q - Z_b)\right)\right) \tag{3}$$

In at least one aspect, equation (3) can be again rewritten with new variable names to ease conceptual understanding with reference to FIG. 1, using equation (4) below. In equation (4), $D=S_W S_X$, $M=W_q X_q-Z_W X_q$, and $$A = -Z_W X_q - W_q Z_X + Z_W Z_X + \frac{S_b}{S_W S_X}(b_q - Z_b).$$

$$Y=f_{act}(D(M-A)) \tag{4}$$

The illustrated architecture 100 is a quantized fully connected layer of a neural network. For example, block 102 may be performed using an accumulator (e.g., to store and accumulate the individual results or portions of the matrix multiplication operation 108 as the results are iteratively or sequentially computed), implementing the M–A portion of equation (4). Specifically, A, which may be referred to as the accumulator initializer, may be pre-computed and used to initialize the accumulator. That is, because each value in A is known when training is complete, A can be computed offline and used to initialize the accumulator. As used herein, initializing the accumulator refers to setting the (initial) value of the accumulator to a specific value (e.g., A) and using the initialized value as the starting point (rather than zero) for subsequent operations performed using the accumulator (e.g., for the matrix multiplication between $W_q$ and $X_q$). Further, the M portion (which may be referred to as matrix multiplication and can be performed using integers during runtime, rather than floating point values) can be computed using the (pre-initialized) accumulator.

In the illustrated example, this block 102 of the architecture 100 includes providing the quantized input $(X_q)$ 104 and quantized weights $(W_q)$ to a matrix multiplication operation 108 (e.g., performed using a pre-initialized accumulator, as discussed above).

As illustrated, the resulting value in the accumulator can then be normalized (e.g., using the normalization operations discussed above, where the value is left-shifted by the number of leading sign bits in the value) to create the normalized tensor 110. As discussed above, this left-shift normalizing operation causes the lower order bits to be filled with values that do not carry real data (e.g., zeros or ones that are filled in without carrying real information). As a result, during subsequent right shifting or saturation operations, these lower-order values can be dropped without losing the real information now stored in the higher order bits. This significantly improves the factional precision of the architecture 100.

In some aspects, the normalizing operation can keep the normalized tensor 110 in the same bit width as the original output of the accumulator. For example, in some conventional systems, the output of the accumulator is 32 bits. In an aspect, the normalizing operation can retain this 32 bit width, with the actual data-carrying values left-shifted by the number of leading sign bits. In one such aspect, the normalized tensor 110 can be designated as 32S0, indicating the tensor is a signed 32-bit integer with zero fractional bits. Although not depicted in the illustrated example, in an aspect, the system can additionally keep track of this number of leading sign bits for downstream operations. If the number of leading sign bits (which corresponds to the number of bits that the normalized tensor 110 was left-shifted) is not tracked, then the actual true output of the block 102 (e.g., the output of the accumulator) may be lost. Generally, tracking the number of leading sign bits can be performed by storing the value in a register or other memory. The number of leading sign bits can then be provided as input to the downstream operations (e.g., to determine the proper shift amount prior to applying the activation function, as discussed below in more detail).

In the illustrated architecture, the normalized tensor 110 is then provided to block 112, which applies dequantization scales of the weight tensor and input tensor (e.g., computing D, which may be referred to as the dequantization operation). Specifically, the weight scaling factor $(S_W)$ 114 and the input scaling factor $(S_X)$ 116 are provided to a multiplication operation 118, alongside the normalized tensor 110. This results in an intermediate tensor 120 that is provided as input to the activation function 124. Block 112 can thereby be used to complete the portion of equation (4) that is provided as input to the activation function.

In some aspects, block 112 involves floating point multiplication. In at least one aspect, the system performs block 112 by converting each of the dequantization scaling factors 114 and 116 to a respective mantissa (e.g., in 16S15) with an integer exponent. That is, the system can break up or delineate each of the floating point values into a fixed-point mantissa and corresponding exponent, allowing them to be multiplied (alongside the normalized tensor 110) using a fixed point or integer multiplication operation 118, rather than floating point computation.

In some aspects, the multiplication operation also receives the determined number of leading sign bits that was used to normalize the normalized tensor 110. For example, the number of leading sign bits can be provided as another exponent in the multiplication (e.g., $2^N$, where N is the number of leading sign bits), along with the exponents determined for the dequantization scaling factors 114 and 116. This ensures that the resulting tensor 120 has the correct value (e.g., as if the normalization had not been performed).

In some aspects, the tensor 120 is first right-shifted (e.g., using a rounded right shift) prior to being provided to the activation function 124. For example, as the multiplication operation 118 may generally result in a larger bit width value (e.g., transforming 32-bit inputs to a 64-bit output), the value is generally right-shifted back to a lower value. In some aspects, this right-shift process is performed based at least in part on the number of leading sign bits determined above, as discussed below in more detail. In many conventional systems, the tensor 120 has the same bit width as the output of the accumulator. For example, if the accumulator tensor is 32 bits, then conventional systems generally also right shifts the tensor 120 back to 32 bits. As discussed above, this results in loss of fractional precision, as a number of bits carrying useful information are dropped.

However, as the normalized tensor 110 was first left-shifted prior to block 112, the result of the multiplication operation 118 can be right-shifted to a lower bit width, dropping only bits that do not carry real information (e.g., false bits). In at least one aspect, rather than shifting back to the size of the normalized tensor 110 (e.g., 32 bits), block 112 can involve right shifting to a smaller bit width. For example, in one such aspect, the tensor 120 may be right-shifted to a size that is half the bit width of the normalized tensor 110 (e.g., to 16 bits).

In at least one aspect, the tensor 120 (e.g., the output of the accumulator) is right-shifted by different amounts based at least in part on the specific characteristics of the activation function being used. That is, the inputs to the activation function 124 (e.g., the tensor 120) may be stored or represented using different formats (e.g., 16S13 or 16S12) based on characteristics of the function. For example, as discussed in more detail below, in some aspects, the inputs to a hyperbolic tangent (TanH) activation function may be effectively stored in 16S13 (e.g., a signed 16-bit value with 13 fractional bits), while inputs to a sigmoid activation function may be effectively stored in 16S12 (e.g., a signed 16-bit value with 12 fractional bits).

In some aspects, the number of leading sign-bits (determined during the above normalization step) can be used to determine the net right shift required to convert the tensor 120 to the format expected as input to the activation function 124. For example, in the case of a sigmoid activation function (which may receive a 16S12 value), the shift amount n may be defined as n=−k+sb+12, where k is the exponent used to represent the floating point quantization scale in fixed point and sb is the previously-determined number of leading sign bits. Similarly, in the case of a TanH activation function (which may receive a 16S13 value), the shift amount n may be defined as n=−k+sb+13.

By right shifting to a smaller bit width than that used by conventional systems, the architecture 100 enables significantly improved computational latency and reduced computational expense. This enables machine learning to be performed on a wider array of devices, including smartphones and other edge devices, and other resource constrained devices, as discussed above. Additionally, as the normalizing operation allows information-carrying bits to be preserved after the subsequent right shifting, fractional precision (and therefore model prediction accuracy) is maintained.

As illustrated, the tensor 120 is then processed by an activation function 124. The activation function 124 can generally correspond to any function, including non-linear functions such as rectified linear unit (ReLU), sigmoid, hyperbolic tangent (TanH), and the like. While some simple activation functions can be performed with little computational expense (e.g., ReLU), others have more complexity (e.g., sigmoid and TanH), which conventionally require more involved processing or computation. For example, the sigmoid activation function may be defined as $$f(x) = \frac{1}{1 + e^{-x}},$$

which requires computation of an exponent. Similarly, the TanH function may be defined as $$f(x) = \frac{e^{2X} - 1}{e^{2X} + 1},$$

which also requires computation of exponential values.

In the illustrated example, as the tensor 120 may be a smaller bit width than the output of the accumulator (e.g., smaller than the normalized tensor 110), the tensor 120 can generally be processed by the activation function 124 more efficiently than conventional systems. For example, computing the activation function 124 on a 16-bit input tensor 120 reduces computation and memory overhead significantly, as compared to conventional 32-bit inputs. In the illustrated example, the resulting output (Y) 126 (also referred to as an activation tensor in some aspects) can similarly have the same bit width of the tensor 120 (e.g., 16 bits), which is smaller than the normalized tensor 110 and smaller than conventional quantized systems.

In some aspects, to further reduce the computational expense of applying the activation function 124, the system can generate (e.g., offline) and use a piecewise-linear approximation of the activation function. For example, as discussed in more detail below, a dynamic range of the activation function can be identified, where the dynamic range corresponds to a region or range of input values where the output of the function does not change or is within a threshold distance of a fixed value. As an example, outside of a range of [−4, 4], the TanH function outputs values very close to −1 and 1, respectively. In an aspect, therefore, the TanH function can be approximated by clamping all input values that are less than −4 to an output of −1, and all values greater than 4 to an output value of 1. This can significantly reduce the computational overhead of applying the TanH function without losing significant precision.

In some aspects, the identified dynamic range of the activation function can thereafter be delineated or divided into a set of segments or portions offline, and a linear approximation can be generated for each such segment or portion. For example, the dynamic range may be divided into 16 or 32 discrete segments. During runtime, application of the activation function 124 can be performed using this piecewise-linear approximation. Such linear functions incur dramatically reduced computational expense, as compared to conventional approaches, without significant loss of precision.

In some aspects, the output 126 can be output from the layer. For example, if the architecture 100 is in the last layer of a neural network, then the output 126 may be used as the output from the model. In the illustrated aspect, the output 126 can additionally be quantized. This may allow the output 126 to be used as quantized input to a subsequent layer of the model, and/or as quantized output from the model.

In the illustrated example, block 128 is used to quantize the output 126 to generate quantized output ($Y_q$) 140. As illustrated, the system can do so by combining a learned scaling factor ($S_Y$) 130 with the output 126 using multiplication operation 132. That is, the system can multiply the output 126 with the scaling factor 130 or the inverse of the scaling factor 130 (which may be learned based on the output values observed during training, as discussed above). In some aspects, the multiplication operation 132 can be similarly performed using the mantissa operations described above (e.g., by decomposing the scaling factor 130 into a 16S15 mantissa with an integer exponent) in order to improve the efficiency of the operation.

In some aspects, the resulting output of the multiplication operation 132 is right-shifted (e.g., using rounded right shift) to the same bit width as the original input (e.g., as the output 126 of the activation function). For example, the tensor 134 may be right-shifted (also referred to as saturated) to 16 bits. The resulting tensor 134 can then be combined (e.g., summed) with the learned zero point ($Z_Y$) 136 (which was also learned based on observed output values during training) using operation 138. The resulting quantized output 140 can then be output from the layer (e.g., as quantized input to a subsequent layer, or as quantized output from the model). In some aspects, the quantized output 140 has a smaller bit width than the output 126 (and may have the same bit width as the quantized input 104 and/or quantized weights 106), thereby improving the efficiency of the machine learning model. For example, the quantized output 140 may have a bit width of 8.

Figure 2A:
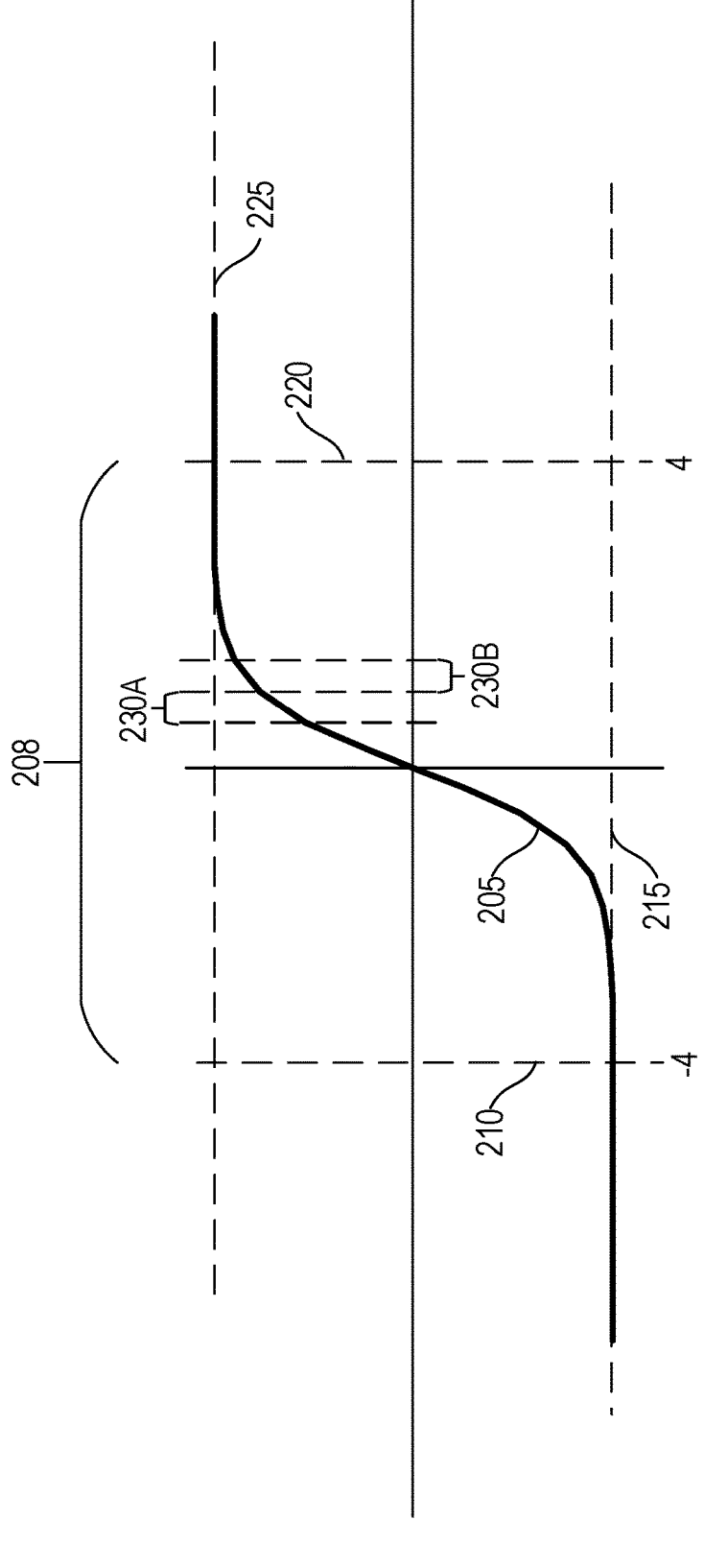
FIG. 2A depicts a piecewise-linear approximation of a TanH activation function for improved quantized machine learning.

Example Piecewise-Linear Approximations of Activation Functions for Improved Quantized Machine Learning FIG. 2A depicts a graph 200A of an example piecewise-linear approximation 205 for improved quantized machine learning. Specifically, the piecewise-linear approximation 205 corresponds to a TanH activation function. In some aspects, the piecewise-linear approximation 205 can be generated offline (e.g., prior to the beginning of training). The approximation 205 can then be used during training as well as during runtime (e.g., in the place of activation function 124 of FIG. 1) to reduce the computational overhead of the model. In some aspects, the piecewise-linear approximation 205 can be stored in memory, such as in a look-up table for efficient access.

As depicted, a dynamic range 208 of the TanH function has been identified with a lower bound indicated by line 210 and an upper bound indicated by line 220. In some aspects, the bounds of the dynamic range 208 can be determined by finding input values (e.g., x values in the illustrated example) beyond which the corresponding output does not change by more than a defined threshold (or is within a defined distance of a fixed value). For example, below the value indicated by the line 210 (which may correspond to an input value of −4), the output of TanH is within a configurable threshold distance from a value of −1, indicated by line 215. Similarly, above the value indicated by line 220, (which may correspond to an input value of 4), the output of TanH is within a configurable threshold distance from a value of 1, indicated by line 225.

In some aspects, therefore, the piecewise-linear approximation 205 is generated by using fixed output values for input values outside of this dynamic range 208 (e.g., a value of −1 for inputs less than or equal to −4, and a value of 1 for inputs greater than or equal to 4). This can significantly reduce the computational overhead of the function, as values outside of the dynamic range 208 are clamped to fixed values.

Further, in the illustrated example, the dynamic range 208 is divided or delineated into a set of discrete segments or portions, such as 230A and 230B (collectively segments 230). Though two such segments 230A and 230B are indicated for clarity, there may be any number of such segments in the dynamic range 208. As discussed above, the system can generate a less complex approximation of the original activation function within each delineated segment 230 of the dynamic range 208. For example, in the illustrated aspect, each respective segment 230 is separately approximated by fitting a respective linear function having a respective slope and bias or offset value. Such linear approximations can be evaluated significantly more rapidly than the conventional TanH function (as well as more efficiently and quickly than conventional approximations that generally rely on higher order functions, such as cubic).

In aspects, the dynamic range 208 can generally be divided into any number of segments 230. In some aspects, the dynamic range 208 can be divided into segments 230 of equal size or of differing size. For example, in one such aspect, the segments 230 can be narrower or smaller (e.g., covering a smaller range of inputs) for regions where the output value of the activation function changes rapidly or significantly, and wider for areas where the activation function is changing less significantly. In some aspects, the number and/or size of segments can be selected (e.g., by an administrator or user) based on factors such as the specific activation function that is being approximated, the hardware on which the piecewise-linear approximation 205 will be executed, and the like. In at least one aspect, the dynamic range 208 of the piecewise-linear approximation 205 is divided into 32 segments 230. In some aspects, the entire piecewise-linear approximation 205 is delineated into 32 segments 230 (e.g., with thirty segments within the dynamic range 208, one segment for values less than the threshold represented by line 210, and one segment for values greater than the threshold represented by line 220).

By using the piecewise-linear approximation 205 with a limited dynamic range 208 and fixed output beyond the dynamic range 208, the system is able to reduce the latency and expense of applying the activation function. Though the illustrated example depicts a piecewise-linear approximation 205 of the TanH function, aspects of the present disclosure are readily applicable to generating piecewise-linear approximations for any activation function.

Figure 2B:
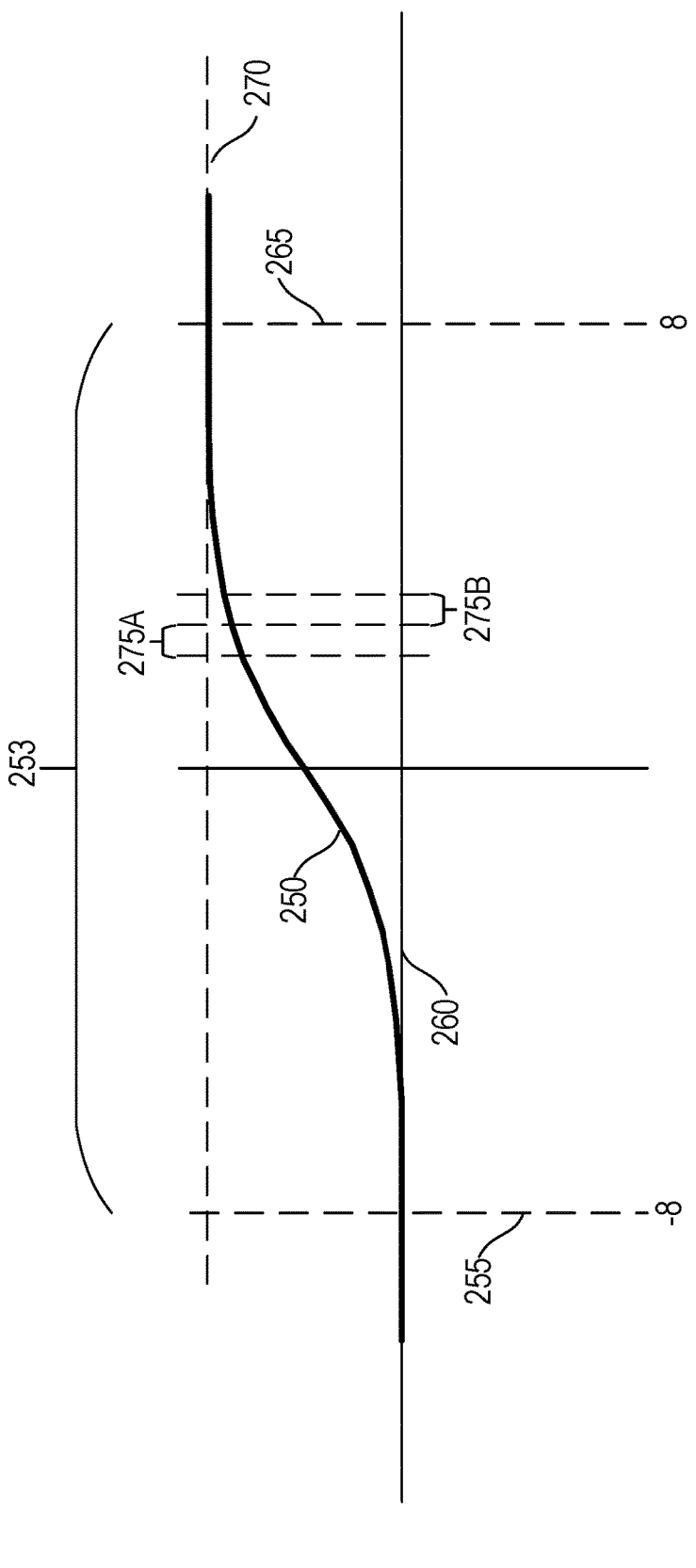
FIG. 2B depicts a piecewise-linear approximation of a sigmoid activation function for improved quantized machine learning.

FIG. 2B depicts a graph 200B of an example piecewise-linear approximation 250 for improved quantized machine learning. Specifically, the piecewise-linear approximation 250 corresponds to a sigmoid activation function. As discussed above with respect to the piecewise-linear approximation 205 of FIG. 2A, in some aspects, the piecewise-linear approximation 250 can be generated offline (e.g., prior to the beginning of training). The approximation 250 can then be used during training as well as during runtime (e.g., in the place of activation function 124 of FIG. 1) to reduce the computational overhead of the model. In some aspects, the piecewise-linear approximation 250 can be stored in memory, such as in a look-up table for efficient access.

As depicted, a dynamic range 253 of the sigmoid function has been identified with a lower bound indicated by line 255 and an upper bound indicated by line 265. In some aspects, the bounds of the dynamic range 253 can be determined by finding input values (e.g., x values in the illustrated example) beyond which the corresponding output does not change by more than a defined threshold (or is within a defined distance of a fixed value). For example, below the value indicated by line 255 (which may correspond to an input value of −8), the output of sigmoid is within a configurable threshold distance from a value of 0, indicated by line 260. Similarly, above the value indicated by line 265, (which may correspond to an input value of 8), the output of sigmoid is within a configurable threshold distance from a value of 1, indicated by line 270.

In some aspects, therefore, the piecewise-linear approximation 250 is generated by using fixed output values for input values outside of this dynamic range 253 (e.g., a value of 0 for inputs less than or equal to −8, and a value of 1 for inputs greater than or equal to 8). This can significantly reduce the computational overhead of the function, as values outside of the dynamic range 253 are clamped to fixed values.

Further, in the illustrated example, the dynamic range 253 is divided or delineated into a set of discrete portions or segments 275A and 275B (collectively segments 275). Though two such segments 275A and 275B are indicated for clarity, there may be any number of such segments in the dynamic range 253. As discussed above, the system can generate a less complex approximation of the original activation function within each delineated segment 275 of the dynamic range 253. For example, in the illustrated aspect, each respective segment 275 is separately approximated by fitting a respective linear function having a respective slope and bias or offset value. Such linear approximations can be evaluated significantly more rapidly than the conventional sigmoid function (as well as more efficiently and quickly than conventional approximations that generally rely on higher order functions, such as cubic).

In aspects, the dynamic range 253 can generally be divided into any number of segments 275. In some aspects, the number of segments can be selected (e.g., by an administrator or user) based on factors such as the specific activation function that is being approximated, the hardware on which the piecewise-linear approximation 250 will be executed, and the like. In at least one aspect, the dynamic range 253 of the piecewise-linear approximation 250 is divided into 32 segments 275. In some aspects, the entire piecewise-linear approximation 250 is delineated into 32 segments 275 (e.g., with thirty segments within the dynamic range 253, one segment for values less than the threshold represented by line 255, and one segment for values greater than the threshold represented by line 265).

By using the piecewise-linear approximation 250 with a limited dynamic range 253 and fixed output beyond the dynamic range 253, the system is able to significantly reduce the latency and expense of applying the activation function. Though the illustrated example depicts a piecewise-linear approximation 250 of the sigmoid function, aspects of the present disclosure are readily applicable to generating piecewise-linear approximations for any activation function.

Example Method for Processing Data Using Quantized Machine Learning

Figure 3:
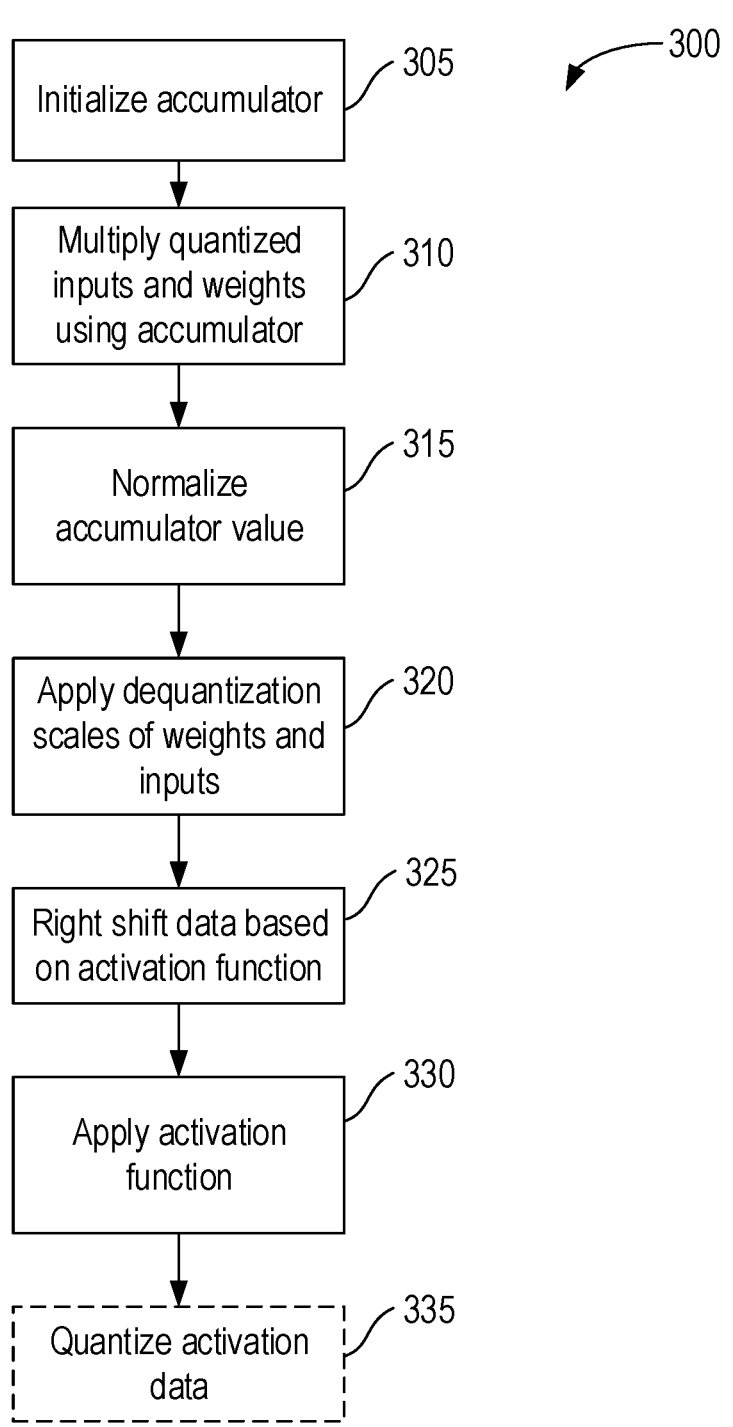
FIG. 3 depicts an example flow diagram illustrating a method for processing data using quantized machine learning.

FIG. 3 depicts an example flow diagram illustrating a method 300 for processing data using quantized machine learning. In some aspects, the method 300 provides additional detail for the operations of the architecture 100 of FIG. 1. In an aspect, the method 300 may be performed by a machine learning system (such as the system discussed in more detail below with reference to FIG. 6), and may be used during training (e.g., during a forward pass of data through a network) or inferencing.

At block 305, the machine learning system initializes an accumulator based on a pre-computed value. In some aspects, the pre-computed value is generated at least in part based on quantization statistics that are learned during training, based on values that have thus-far been seen for each tensor (e.g., for the input tensors and/or weight tensors). For example, as discussed above, the accumulator may be initialized based on the quantized weights ($W_q$), the zero point of the input tensors ($Z_X$), the zero point of the weight tensors ($Z_W$), the scaling factor of the bias term or tensor (SA), the scaling factor of the weight tensors ($S_W$), the scaling factor of the input tensors ($S_X$), the quantized bias ($b_q$), and/or the zero point of the bias ($Z_b$).

As an example, as discussed above with reference to equation (3), the machine learning system may compute $$-W_q Z_X + Z_W Z_X + \frac{S_b}{S_W S_X}(b_q - Z_b),$$

and initialize the accumulator using this value. As each of these terms is known once training is complete (e.g., the quantized weights and biases, as well as the quantization statistics for the weights, biases, and inputs), the machine learning system can pre-compute this value offline, and need not do so during runtime inferencing.

At block 310, the machine learning system can multiply the quantized input tensor $X_q$ (e.g., quantized input 104 of FIG. 1) and the quantized weight tensor $W_q$ (e.g., quantized weights 106 of FIG. 1) using the initialized accumulator.

At block 315, the machine learning system then normalizes the value stored in the accumulator (e.g., the result of multiplying the quantized input and quantized weights, combined with the pre-computed accumulator initialization value). In some aspects, as discussed above, this normalization operation involves determining the number of leading sign bits on the value, and left shifting the value by that number of leading sign bits. This can help preserve the information-carrying bits during subsequent operations.

At block 320, the machine learning system can apply the dequantization scales of the weights and inputs, as discussed above (e.g., with reference to block 112 of FIG. 1). In some aspects, as discussed above, the machine learning system can perform this dequantization more efficiently and with reduced computational expense by decomposing each value into a fixed point mantissa and corresponding exponent, and multiplying the mantissas/exponents (including the number of leading sign bits determined during the normalization operation).

At block 325, the machine learning system then right shifts the resulting tensor (generated in block 320). In the illustrated example, the machine learning system right shifts the data based at least in part on the activation function that will be used. That is, in one such aspect, the inputs to the activation function can be stored or represented using different formats (e.g., 16S13 or 16S12) based on characteristics of the function (e.g., based on the width of the dynamic range of the piecewise-linear approximation). For example, the inputs to a piecewise-linear approximation of a TanH function (e.g., piecewise-linear approximation 205 of FIG. 2A) may be effectively stored in 16S13 (e.g., a signed 16-bit value with 13 fractional bits). As another example, the inputs to a piecewise-linear approximation of a sigmoid function (e.g., piecewise-linear approximation 250 of FIG. 2B) may be effectively stored in 16S12 (e.g., a signed 16-bit value with 12 fractional bits).

In some aspects, as discussed above, this right-shift operation is performed based at least in part on the number of leading sign bits determined in block 315. That is, magnitude of the right shift may be defined based at least in part on the number of leading sign bits determined during the normalization.

At block 330, the machine learning system applies the activation function (or applies a piecewise-linear approximation of an activation function), as discussed above. That is, the machine learning system may compute activation output Y (e.g., output 126 of FIG. 1) by providing the tensor generated in block 325 to the activation function, or piecewise-linear approximation (such as the piecewise-linear approximation 205 of FIG. 2A, or the piecewise-linear approximation 250 of FIG. 2B). As the input to the activation function is generally stored in a smaller bit width than conventional systems (e.g., stored in half the bit width of the accumulator output, whereas conventional systems keep the activation input at the same bit width as the accumulator output), block 330 can be performed with significantly reduced computational overhead. Additionally, if a piecewise-linear approximation is used, then the expense is reduced even further.

At block 335, the machine learning system can optionally quantize the activation data (e.g., the output of the activation function). In some aspects, rather than quantizing the activation data, the activation data can instead be provided as output from the neural network (e.g., to a downstream processing task), or be provided as un-quantized input to a downstream layer of the model. In other aspects, the machine learning system can quantize the activation data (e.g., as discussed above with reference to block 128 of FIG. 1). The quantized data can then be provided as quantized input to a subsequent layer of the model, and/or provided as quantized output from the model.

As discussed above, the method 300 generally enables reduced computational overhead (e.g., reduced latency, reduced power consumption, reduced computational or processing expense, reduced heat generation, and the like), as compared to conventional approaches.

Note that FIG. 3 is just one example of a method, and other methods including fewer, additional, or alternative steps are possible consistent with this disclosure.

Figure 4:
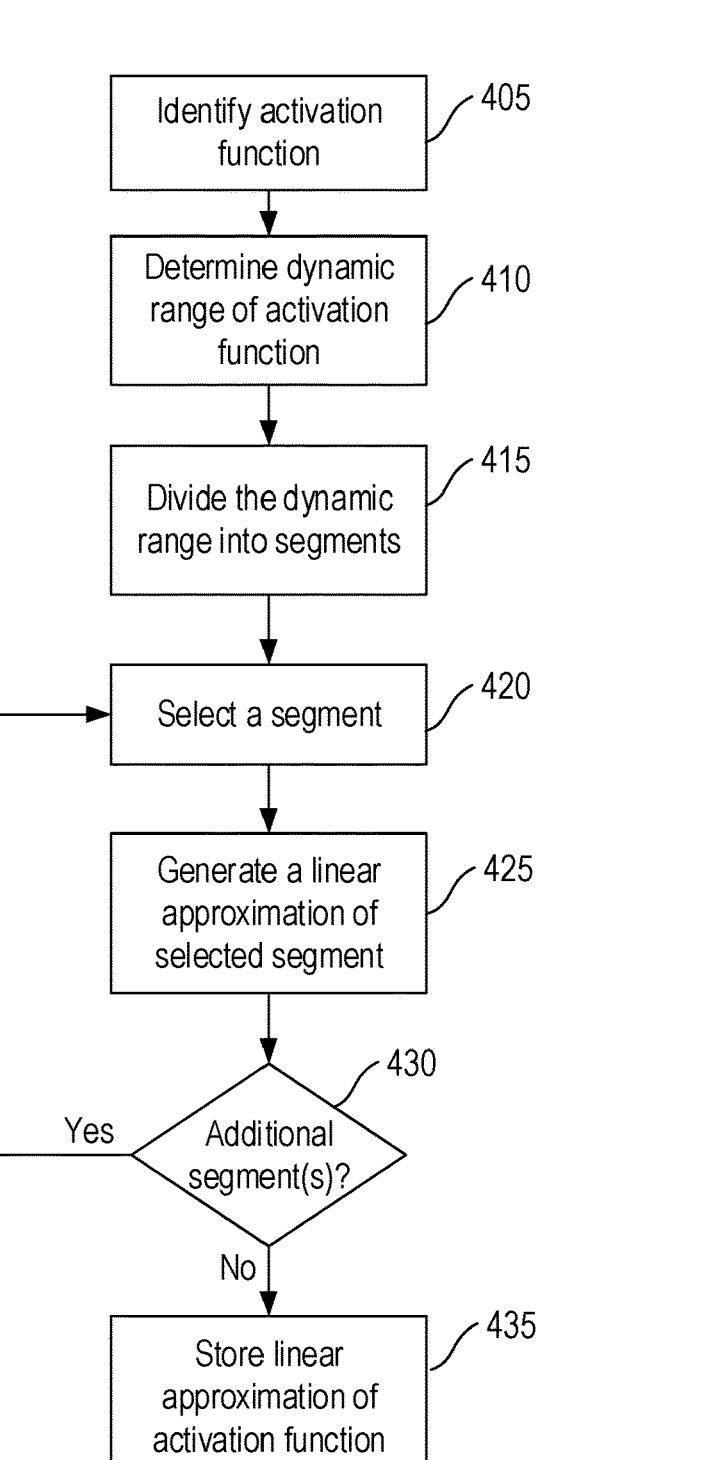
FIG. 4 depicts an example flow diagram illustrating a method for generating piecewise-linear approximations of activation functions for improved machine learning.

Example Method for Generating Piecewise-Linear Approximations of Activation Functions for Improved Machine Learning FIG. 4 depicts an example flow diagram illustrating a method 400 for generating piecewise-linear approximations of activation functions for improved machine learning. In some aspects, the method 400 provides additional detail for the generation of the piecewise-linear approximations 205 and 250 FIGS. 2A and 2B. In an aspect, the method 400 may be performed by a machine learning system offline, such as the system discussed in more detail below with reference to FIG. 6 (e.g., prior to training a machine learning model and/or inferencing using a trained model).

At block 405, the machine learning system identifies the activation function that is to be used. In some aspects, a user or administrator may designate, for each layer of a neural network, which activation function to use. In some aspects, the activation function can be identified in a predefined model architecture.

At block 410, the machine learning system determines the dynamic range of the identified activation function. As discussed above, in some aspects, the dynamic range may correspond to a range of input values where the output value changes above some threshold. In some aspects, the dynamic range is determined by identifying a range of input values where, outside of the dynamic range, the output value changes below some threshold and/or is within a defined distance of a fixed value (or where the value outside of the dynamic range is sufficiently close to a linear function). For example, as discussed above, the TanH function may have a dynamic range of [−4,4] (as discussed above with reference to FIG. 2A) while the sigmoid function has a dynamic range of [−8, 8] (as discussed above with reference to FIG. 2B). In one aspect, input values that are outside of the dynamic range can be clamped to a fixed value.

At block 415, the machine learning system divides the determined dynamic range into a set of discrete segments or portions. For example, as discussed above with reference to FIGS. 2A and 2B, the machine learning system may delineate the dynamic range of the function into 32 equal-width portions (e.g., segments 230 of FIG. 2A and/or segments 275 of FIG. 2B).

At block 420, the machine learning system selects one of the segments in the dynamic range. In aspects, the machine learning system can use any suitable criteria to select the segment (including randomly or pseudo-randomly), as each segment will be evaluated in turn during the method 400. Although an iterative process (selecting and approximating each segment in turn) is depicted for conceptual clarity, in some aspects, the machine learning system may select and process some or all of the segments in parallel.

At block 425, the machine learning system generates a linear approximation of the activation function with respect to the selected segment. For example, the machine learning system can fit a linear function (having a slope and a bias) to the activation function values within the segment. Generally, evaluating the linear approximation requires significantly reduced computational overhead, as compared to evaluating the original activation function. Further, depending on the size of the segments (e.g., the number of segments used to divide the dynamic range), the linear approximation can retain high accuracy.

At block 430, the machine learning system determines whether there are any additional segment(s) in the dynamic range that have not been approximated. If so, then the method 400 returns to block 420. If not, then the method 400 continues to block 435.

At block 435, the machine learning system can store the generated piecewise-linear approximation of the activation function for future use. For example, the machine learning system may store the set of linear functions (e.g., the slopes and biases) that make up the dynamic range (and, in some aspects, the portions outside of the dynamic range), along with an indication of the range of input values that correspond to each linear function (e.g., indicating which function should be used to generate output, given a specific input value). In some aspects, the machine learning system stores the piecewise-linear approximation as part of the machine learning model (e.g., in a memory, using a look-up table, and the like), such that the approximation can be used during training and/or inferencing.

As discussed above, the piecewise-linear approximation of the activation function can substantially reduce the computational overhead of applying activation functions, thereby significantly decreasing the latency of training and inferencing, as well as reducing other burdens including power consumption.

Note that FIG. 4 is just one example of a method, and other methods including fewer, additional, or alternative steps are possible consistent with this disclosure.

Example Method for Quantized Machine Learning

FIG. 5 depicts an example flow diagram illustrating a method 500 for quantized machine learning.

At block 505, a quantized input matrix is accessed at a layer of a neural network.

At block 510, a first interim value is generated in an accumulator by performing matrix multiplication, using the accumulator, of the quantized input matrix and a quantized weight matrix associated with the layer of the neural network.

At block 515, the first interim value is normalized based at least in part on one or more leading sign bits of the first interim value.

At block 520, the normalized first interim value is dequantized.

At block 525, a second interim value is generated by applying a rounded right-shift operation to the dequantized normalized first interim value.

At block 530, activation data is generated by applying an activation function to the second interim value.

In some aspects, normalizing the first interim value comprises: determining a number of leading sign bits of the first interim value; and left shifting the first interim value by the determined number of leading sign bits.

In some aspects, the second interim value has a smaller bit-width than the normalized first interim value.

In some aspects, a bit-width of the normalized first interim value is at least twice as large as a bit-width of the second interim value.

In some aspects, wherein: the normalized first interim value has a bit-width of 32-bits; and the second interim value has a bit-width of 16-bits.

In some aspects, applying the activation function comprises applying a piecewise-linear approximation of the activation function.

In some aspects, the piecewise-linear approximation of the activation function is generated by: identifying a dynamic range of the activation function, wherein, outside of the dynamic range, values of the activation function are within a threshold distance from one or more fixed values; dividing the dynamic range into a set of discrete portions; and generating a linear approximation for each discrete portion of the activation function.

In some aspects, dividing the dynamic range into the set of discrete portions comprises dividing the activation function into a number of discrete portions, the number selected based on accuracy of the piecewise-linear approximation and computational cost of the piecewise-linear approximation.

In some aspects, the method 500 further comprises quantizing the activation data to a smaller bit-width.

In some aspects, the method 500 further comprises outputting the quantized activation data to a subsequent layer of the neural network.

In some aspects, the method 500 further comprises outputting the activation data from the layer of the neural network.

Note that FIG. 5 is just one example of a method, and other methods including fewer, additional, or alternative steps are possible consistent with this disclosure.

Example Processing System for Quantized Machine Learning

In some aspects, the workflows, techniques, and methods described with reference to FIGS. 1-5 may be implemented on one or more devices or systems. FIG. 6 depicts an example processing system 600 configured to perform various aspects of the present disclosure, including, for example, the techniques and methods described with respect to FIGS. 1-5. In one aspect, the processing system 600 may correspond to a machine learning system that trains and/or uses quantized machine learning models, such as using the quantized architecture 100 of FIG. 1 and/or piecewise-linear approximations of activation functions, such as the piecewise-linear approximations 205 and 250 of FIGS. 2A and 2B. In at least some aspects, as discussed above, the operations described below with respect to the processing system 600 may be distributed across any number of devices.

Processing system 600 includes a central processing unit (CPU) 602, which in some examples may be a multi-core CPU. Instructions executed at the CPU 602 may be loaded, for example, from a program memory associated with the CPU 602 or may be loaded from a memory partition (e.g., in memory 624).

Processing system 600 also includes additional processing components tailored to specific functions, such as a graphics processing unit (GPU) 604, a digital signal processor (DSP) 606, a neural processing unit (NPU) 608, a multimedia processing unit 610, and a wireless connectivity component 612.

An NPU, such as NPU 608, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPUs), neural network processor (NNP), intelligence processing unit (IPU), vision processing unit (VPU), or graph processing unit.

NPUs, such as NPU 608, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process this piece through an already trained model to generate a model output (e.g., an inference).

In one implementation, NPU 608 is a part of one or more of CPU 602, GPU 604, and/or DSP 606.

In some examples, wireless connectivity component 612 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity component 612 is further connected to one or more antennas 614.

Processing system 600 may also include one or more sensor processing units 616 associated with any manner of sensor, one or more image signal processors (ISPs) 618 associated with any manner of image sensor, and/or a navigation processor 620, which may include satellite-based positioning system components (e.g., GPS or GLONASS) as well as inertial positioning system components.

Processing system 600 may also include one or more input and/or output devices 622, such as screens, touch-sensitive surfaces (including touch-sensitive displays), physical buttons, speakers, microphones, and the like.

In some examples, one or more of the processors of processing system 600 may be based on an ARM or RISC-V instruction set.

Processing system 600 also includes memory 624, which is representative of one or more static and/or dynamic memories, such as a dynamic random access memory, a flash-based static memory, and the like. In this example, memory 624 includes computer-executable components, which may be executed by one or more of the aforementioned processors of processing system 600.

In particular, in this example, memory 624 includes a multiply component 624A, a dequantization component 624B, an activation component 624C, and a quantization component 624D. The memory 624 also includes a set of quantization parameters 624E and model parameters 624F. The model parameters 624F may generally correspond to the learned parameters of all or a part of a machine learning model, such as the weights and/or biases for one or more layers of a neural network. The quantization parameters 624E generally correspond to the statistics or parameters used to control the quantization operations, such as a scaling factor and/or zero point for each tensor (e.g., for input tensors, output activations, weights, and/or biases of one or more layers of the model). As discussed above, the quantization parameters 624E and model parameters 624F may be learned during training of the model. The depicted components, and others not depicted, may be configured to perform various aspects of the techniques described herein. Though depicted as discrete components for conceptual clarity in FIG. 6, the components may be collectively or individually implemented in various aspects.

Processing system 600 further comprises multiply circuit 626, dequantization circuit 627, activation circuit 628, and quantization circuit 629. The depicted circuits, and others not depicted, may be configured to perform various aspects of the techniques described herein.

For example, multiply component 624A and multiply circuit 626 may be used to perform integer and/or matrix multiplication (e.g., using an accumulator, and/or multiplication operations 118 and/or 132 of FIG. 1). In some aspects, as discussed above, the multiply component 624A and multiply circuit 626 may use mantissa-based operations that can reduce or eliminate the need for floating point operations. Dequantization component 624B and dequantization circuit 627 may be used to dequantize values (e.g., based on the quantization parameters 624E). Activation component 624C and activation circuit 628 may be used to apply activation functions (such as activation function 124 of FIG. 1) and/or approximated activation functions (such as piecewise-linear approximations 205 and 250 of FIGS. 2A and 2B). In some aspects, the activation component 624C and activation circuit 628 can additionally or alternatively be used to generate the piecewise-linear approximations, as discussed above. Quantization parameter 624E and quantization circuit 629 may be used to quantize values (e.g., to generate quantized output 140 of FIG. 1) for subsequent processing.

Though depicted as separate components and circuits for clarity in FIG. 6, multiply circuit 626, dequantization circuit 627, activation circuit 628, and quantization circuit 629 may collectively or individually be implemented in other processing devices of processing system 600, such as within CPU 602, GPU 604, DSP 606, NPU 608, and the like.

Generally, processing system 600 and/or components thereof may be configured to perform the methods described herein.

Notably, in other aspects, aspects of processing system 600 may be omitted, such as where processing system 600 is a server computer or the like. For example, multimedia processing unit 610, wireless connectivity component 612, sensor processing units 616, ISPs 618, and/or navigation processor 620 may be omitted in other aspects. Further, aspects of processing system 600 maybe distributed between multiple devices.

EXAMPLE CLAUSES

Clause 1: A method, comprising: accessing a quantized input matrix at a layer of a neural network; generating a first interim value in an accumulator by performing matrix multiplication, using the accumulator, of the quantized input matrix and a quantized weight matrix associated with the layer of the neural network; normalizing the first interim value based at least in part on one or more leading sign bits of the first interim value; dequantizing the normalized first interim value; generating a second interim value by applying a rounded right-shift operation to the dequantized normalized first interim value; and generating activation data by applying an activation function to the second interim value.

Clause 2: The method according to Clause 1, wherein normalizing the first interim value comprises: determining a number of leading sign bits of the first interim value; and left shifting the first interim value by the determined number of leading sign bits.

Clause 3: The method according to any one of Clauses 1-2, wherein the second interim value has a smaller bit-width than the normalized first interim value.

Clause 4: The method according to any one of Clauses 1-3, wherein a bit-width of the normalized first interim value is at least twice as large as a bit-width of the second interim value.

Clause 5: The method according to any one of Clauses 1-4, wherein: the normalized first interim value has a bit-width of 32-bits; and the second interim value has a bit-width of 16-bits.

Clause 6: The method according to any one of Clauses 1-5, wherein applying the activation function comprises applying a piecewise-linear approximation of the activation function.

Clause 7: The method according to any one of Clauses 1-6, wherein the piecewise-linear approximation of the activation function is generated by: identifying a dynamic range of the activation function, wherein, outside of the dynamic range, values of the activation function are within a threshold distance from one or more fixed values; dividing the dynamic range into a set of discrete portions; and generating a linear approximation for each discrete portion of the activation function.

Clause 8: The method according to any one of Clauses 1-7, wherein dividing the dynamic range into the set of discrete portions comprises dividing the activation function into a number of discrete portions, the number selected based on accuracy of the piecewise-linear approximation and computational cost of the piecewise-linear approximation.

Clause 9: The method according to any one of Clauses 1-8, further comprising quantizing the activation data to a smaller bit-width.

Clause 10: The method according to any one of Clauses 1-9, further comprising outputting the quantized activation data to a subsequent layer of the neural network.

Clause 11: The method according to any one of Clauses 1-10, further comprising outputting the activation data from the layer of the neural network.

Clause 12: A system, comprising: a memory comprising computer-executable instructions; and one or more processors configured to execute the computer-executable instructions and cause the processing system to perform a method in accordance with any one of Clauses 1-11.

Clause 13: A system, comprising means for performing a method in accordance with any one of Clauses 1-11.

Clause 14: A non-transitory computer-readable medium comprising computer-executable instructions that, when executed by one or more processors of a processing system, cause the processing system to perform a method in accordance with any one of Clauses 1-11.

Clause 15: A computer program product embodied on a computer-readable storage medium comprising code for performing a method in accordance with any one of Clauses 1-11.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term "connected to", in the context of sharing electronic signals and data between the elements described herein, may generally mean in data communication between the respective elements that are connected to each other. In some cases, elements may be directly connected to each other, such as via one or more conductive traces, lines, or other conductive carriers capable of carrying signals and/or data between the respective elements that are directly connected to each other. In other cases, elements may be indirectly connected to each other, such as via one or more data busses or similar shared circuitry and/or integrated circuit elements for communicating signals and data between the respective elements that are indirectly connected to each other.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method, comprising:
accessing a quantized input matrix at a layer of a neural network;
generating a first interim value in an accumulator by performing matrix multiplication, using the accumulator, of the quantized input matrix and a quantized weight matrix associated with the layer of the neural network;
normalizing the first interim value based on a number of most-significant bits (MSBs) of the first interim value that match a sign bit of the first interim value;
dequantizing the normalized first interim value;
generating a second interim value by applying a rounded right-shift operation to the dequantized normalized first interim value; and
generating activation data by applying an activation function to the second interim value.

2. The computer-implemented method of claim 1, wherein normalizing the first interim value comprises:
determining the number of MSBs that match the sign bit of the first interim value; and
left shifting the first interim value by the determined number of MSBs.

3. The computer-implemented method of claim 1, wherein the second interim value has a smaller bit-width than the normalized first interim value.

4. The computer-implemented method of claim 3, wherein a bit-width of the normalized first interim value is at least twice as large as a bit-width of the second interim value.

5. The computer-implemented method of claim 3, wherein:
the normalized first interim value has a bit-width of 32-bits; and
the second interim value has a bit-width of 16-bits.

6. The computer-implemented method of claim 1, wherein applying the activation function comprises applying a piecewise-linear approximation of the activation function.

7. The computer-implemented method of claim 6, wherein the piecewise-linear approximation of the activation function is generated by:
identifying a dynamic range of the activation function, wherein, outside of the dynamic range, values of the activation function are within a threshold distance from one or more fixed values;

21 dividing the dynamic range into a set of discrete portions; and generating a linear approximation for each discrete portion of the activation function.

8. The computer-implemented method of claim 7, wherein dividing the dynamic range into the set of discrete portions comprises dividing the activation function into a number of discrete portions, the number selected based on accuracy of the piecewise-linear approximation and computational cost of the piecewise-linear approximation.

9. The computer-implemented method of claim 1, further comprising quantizing the activation data to a smaller bit-width.

10. The computer-implemented method of claim 9, further comprising outputting the quantized activation data to a subsequent layer of the neural network.

11. The computer-implemented method of claim 1, further comprising generating an output of the neural network based on the activation data.

12. A processing system comprising:

memory comprising computer-executable instructions; and one or more processors configured to execute the computer-executable instructions and cause the processing system to perform an operation comprising:

accessing a quantized input matrix at a layer of a neural network;

generating a first interim value in an accumulator by performing matrix multiplication, using the accumulator, of the quantized input matrix and a quantized weight matrix associated with the layer of the neural network;

normalizing the first interim value based on a number of most-significant bits (MSBs) of the first interim value that match a sign bit of the first interim value;

dequantizing the normalized first interim value;

generating a second interim value by applying a rounded right-shift operation to the dequantized normalized first interim value; and generating activation data by applying an activation function to the second interim value.

13. The processing system of claim 12, wherein normalizing the first interim value comprises:

determining the number of MSBs that match the sign bit of the first interim value; and left shifting the first interim value by the determined number of MSBs.

14. The processing system of claim 12, wherein a bit-width of the normalized first interim value is at least twice as large as a bit-width of the second interim value.

15. The processing system of claim 12, wherein applying the activation function comprises applying a piecewise-linear approximation of the activation function.

16. The processing system of claim 15, wherein the piecewise-linear approximation of the activation function is generated by:

identifying a dynamic range of the activation function, wherein, outside of the dynamic range, values of the activation function are within a threshold distance from one or more fixed values;

dividing the dynamic range into a set of discrete portions; and generating a linear approximation for each discrete portion of the activation function.

17. The processing system of claim 16, wherein dividing the dynamic range into the set of discrete portions comprises dividing the activation function into a number of discrete portions, the number selected based on accuracy of the piecewise-linear approximation and computational cost of the piecewise-linear approximation.

18. The processing system of claim 12, the operation further comprising quantizing the activation data to a smaller bit-width.

19. The processing system of claim 18, the operation further comprising outputting the quantized activation data to a subsequent layer of the neural network.

20. The processing system of claim 12, the operation further comprising generating an output of the neural network based on the activation data.

21. A non-transitory computer-readable medium comprising computer-executable instructions that, when executed by one or more processors of a processing system, cause the processing system to perform an operation comprising:

accessing a quantized input matrix at a layer of a neural network;

generating a first interim value in an accumulator by performing matrix multiplication, using the accumulator, of the quantized input matrix and a quantized weight matrix associated with the layer of the neural network;

normalizing the first interim value based on a number of most-significant bits (MSBs) of the first interim value that match a sign bit of the first interim value;

dequantizing the normalized first interim value;

generating a second interim value by applying a rounded right-shift operation to the dequantized normalized first interim value; and generating activation data by applying an activation function to the second interim value.

22. The non-transitory computer-readable medium of claim 21, wherein normalizing the first interim value comprises:

determining the number of MSBs that match the sign bit of the first interim value; and left shifting the first interim value by the determined number of MSBs.

23. The non-transitory computer-readable medium of claim 21, wherein a bit-width of the normalized first interim value is at least twice as large as a bit-width of the second interim value.

24. The non-transitory computer-readable medium of claim 21, wherein applying the activation function comprises applying a piecewise-linear approximation of the activation function.

25. The non-transitory computer-readable medium of claim 24, wherein the piecewise-linear approximation of the activation function is generated by:

identifying a dynamic range of the activation function, wherein, outside of the dynamic range, values of the activation function are within a threshold distance from one or more fixed values;

dividing the dynamic range into a set of discrete portions; and generating a linear approximation for each discrete portion of the activation function.

26. The non-transitory computer-readable medium of claim 25, wherein dividing the dynamic range into the set of discrete portions comprises dividing the activation function into a number of discrete portions, the number selected based on accuracy of the piecewise-linear approximation and computational cost of the piecewise-linear approximation.

27. The non-transitory computer-readable medium of claim 21, the operation further comprising quantizing the activation data to a smaller bit-width.

28. The non-transitory computer-readable medium of claim 27, the operation further comprising outputting the quantized activation data to a subsequent layer of the neural network.

29. The non-transitory computer-readable medium of claim 21, the operation further comprising generating an output of the neural network based on the activation data.

30. A processing system, comprising:

means for accessing a quantized input matrix at a layer of a neural network;

means for generating a first interim value in an accumulator by performing matrix multiplication, using the accumulator, of the quantized input matrix and a quantized weight matrix associated with the layer of the neural network;

means for normalizing the first interim value based on a number of most-significant bits (MSBs) of the first interim value that match a sign bit of the first interim value;

means for dequantizing the normalized first interim value;

means for generating a second interim value by applying a rounded right-shift operation to the dequantized normalized first interim value; and means for generating activation data by applying an activation function to the second interim value.

* * * * *